J. E. Kelly,
Riding Saddle.
Nº 27,719.    Patented Apr. 3, 1860.
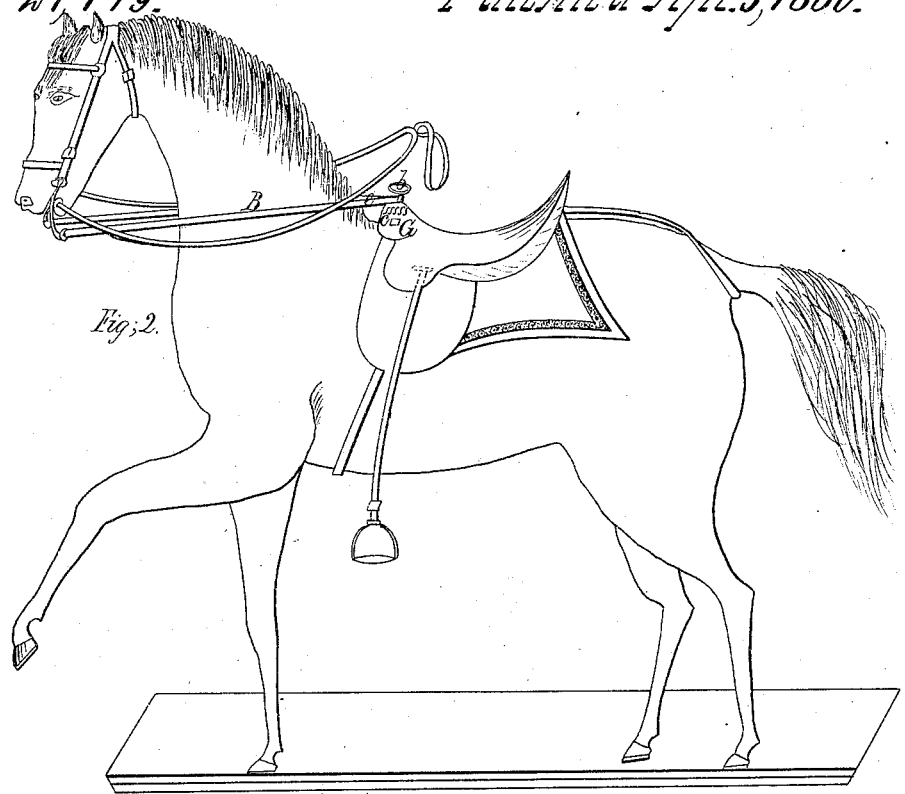
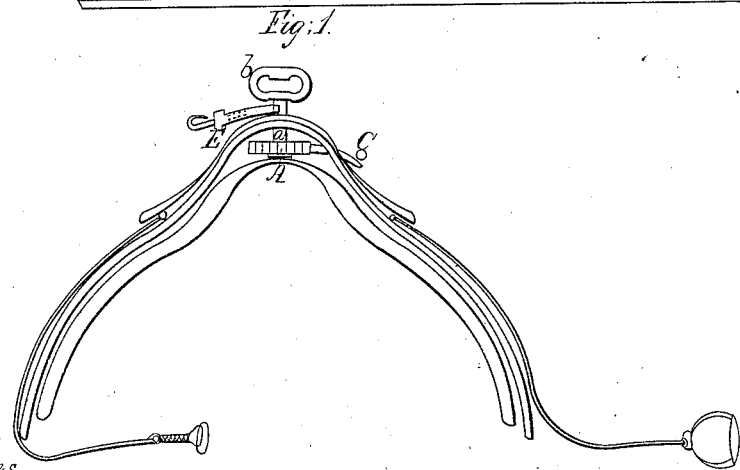
Witnesses.
Edm. F. Brown.
J. B. Woodruff.
Inventor.
John E. Kelly.

UNITED STATES PATENT OFFICE.

JOHN E. KELLY, OF NEW YORK, N. Y.

RIDING-SADDLE.

Specification of Letters Patent No. 27,719, dated April 3, 1860.

*To all whom it may concern:*

Be it known that I, JOHN E. KELLY, of the city and State of New York, have invented a new and useful Combination of Mechanism, denominated by me, a "Riding Saddle-Brake," which when applied to a saddle gives the rider complete control over the most vicious or unmanageable horse independent of the use of the ordinary riding reins, thereby relieving him from the necessity of holding the animal by hand and affording him perfect liberty of his arms to be used for any other purpose he may desire.

To enable others skilled in the art to manufacture and use my invention, the following full and exact description is given, reference being had to the accompanying drawings, and the letters marked thereon.

Figure 1, represents a front end view of a riding saddle with the brake attached. Fig. 2, represents a horse, saddle and bridle with the brake as used.

(A) as seen in Fig. 1, is a ratchet-wheel having an upright shaft (a) passing up through the pommel or front part of the saddle, and terminates in the ring or handle (b) which is used for turning the brake. The pawl to prevent the brake from giving way, extends from the ratchet wheel through the upper lateral part of the saddle terminating in a head or button as shown at (C). To the shaft (a) is firmly secured a strong cord or strap (E) having on its loose end a snaffle hook. The check-line (B) should be of such length as to rest moderately tight on the neck in front of the saddle. When this brake is thus arranged and properly adjusted on the horse it will be readily seen that by connecting the strap (E) to the check line (B) by means of the snaffle hook; then by turning the brake the check line may be quickly so shortened as at once to arrest the most determined action of the horse.

By using this brake ladies ride the most sprightly horses with safety; and sportsmen, soldiers, and all other riders find that they can control the most determined or vicious animal in a moment, thereby, leaving the hands and arms of the rider at perfact liberty to be used in any manner or for any purpose whatever desired. When it is desirable to leave the horse in place, a few turns of the brake tightens the check, and renders him secure, removing, or obviating the necessity of strap hitching.

By pressing on the button (C) the pawl is withdrawn, and the brake revolving backward relieves the tension of the check and liberates the horse.

Having thus fully decribed my invention, what I claim as new, and desire to secure by Letters Patent is—

The application of a brake to a saddle so constructed and arranged as to operate substantially as above set forth, and for the purposes and uses herein specified.

JOHN E. KELLY.

Witnesses:
EDW. F. BROWN,
J. B. WOODRUFF.